United States Patent [19]

Nyman

[11] 3,993,494

[45] Nov. 23, 1976

[54] POWDERED MATERIAL PARTING AGENT

[75] Inventor: Tage Nyman, Bromma, Sweden

[73] Assignee: AB Wet Talc, Enskede, Sweden

[22] Filed: Oct. 25, 1974

[21] Appl. No.: 517,874

[30] Foreign Application Priority Data

Oct. 30, 1973 Norway................. 4184/73

[52] U.S. Cl................. 106/38.22; 106/300; 106/308 Q; 427/133; 427/220
[51] Int. Cl.$^2$............................. B28B 7/36
[58] Field of Search........... 106/38.22, 38.27, 38.28, 106/308 Q, 300; 427/133, 135, 215, 220

[56] References Cited
UNITED STATES PATENTS

| | | | |
|---|---|---|---|
| 1,864,151 | 6/1932 | Simms et al. | 106/308 Q |
| 2,083,176 | 6/1937 | Willson | 252/23 |
| 2,291,082 | 7/1942 | Jarmus | 106/308 Q |
| 2,356,814 | 8/1944 | Bimmerman et al. | 106/38.22 |
| 2,419,144 | 4/1947 | Kelly | 252/23 |
| 2,784,108 | 3/1957 | Cupper | 106/38.22 |
| 3,022,185 | 2/1962 | Delfosse | 106/308 Q |
| 3,052,629 | 9/1962 | Morrow et al. | 106/38.22 |
| 3,213,024 | 10/1965 | Blake et al. | 106/38.22 |
| 3,504,081 | 3/1970 | Aron | 106/38.22 |
| 3,713,851 | 1/1973 | Cekada | 106/38.22 |

Primary Examiner—Lorenzo B. Hayes
Attorney, Agent, or Firm—Flynn & Frishauf

[57] ABSTRACT

A powdered talc-containing material useful, for example, as a parting agent or compound, containing talc together with at least one organic compound which possesses good adhesion properties with respect to talc. The powdered materials preferably contain 1–15% of the said organic compounds, for example, high molecular number organic compounds formed by distillation fractionation of mineral oil having a boiling point exceeding 200° C; aryl and alkyl esters; aryl and alkyl amides of benzene; alkane, alkene and alkyne carboxcylic acids or the corresponding dicarboxylic acids; polyalcohols; glycerine; silica oil and silicone oil; and secondary alkyl sulphates. The preferred agents are dioctyl phthalate and a combination of glycerine with secondary alkyl sulphate.

2 Claims, No Drawings

POWDERED MATERIAL PARTING AGENT

This invention relates to pulverulent media, for example parting agents or compounds, which contain talc.

In many industrial and technical processes parting agents are used to prevent the sticking together of two surfaces which are in mutual contact, when one or both of these surfaces are, by their nature, sticky. Examples of the separation of two sticky surfaces occur in roofing paper rolls or layers of plastics sheeting. Examples of the separation of surfaces where only one is sticky include the vulcanising of rubber or the casting of articles from rubber or other comparable materials in moulds. The undesired adhesion between the surface of the rubber and the surface of the mould is in the last named case caused or promoted in particular by the fact that the contact between the two surfaces, which must later be separated, takes place at a high temperature.

In the casting of articles made from rubber, the material to be cast is introduced in a heated state into the appropriate casting mould, whereas in the vulcanising of articles of rubber, material which is initially cold is placed in the vulcanising mould, the walls of which are then heated. In both cases it is necessary to take precautions which will make possible a separation of the material from the mould walls when the moulding operation has been completed.

Parting agents for preventing adhesion in the circumstances just described are already known. In the rubber industry and related technical fields talc in the form of a powder is principally used. On account of its physical properties, talc is especially suitable for this purpose. It is used as a mould coating agent which is spread over the walls of the vulcanising mould or casting mould.

It is known that the surface of the talc particles is fatty and oily. Because talc is a mineral, it is in addition highly resistant to heat. For the same reason, manufacturing costs are low.

In order to ensure a good separating action, the talc is used in the form of a powder which is generally extremely fine. For this reason however, talc has a strong tendency towards the production of dust. This is regarded as a considerable disadvantage, which constitutes a particular drawback in those fields of operation, such as in the rubber industry, where large quantities of talc are commonly used, from the point of view both of working conditions and protection of the environment. This problem has recently attracted increased attention, since the inhalation of talc or talc dust over a long period involves a risk of contracting talcosis and eczema.

In order to eliminate or at least reduce the risk of dust formation, the practice of wetting the talc with water before use has recently become common. It is however extremely difficult to wet large quantities of talc thoroughly and uniformly. The wetting operation suffers moreover from the drawback that it must be carried out at and indeed immediately adjacent to the place where the talc will be used. Moreover, should the talc be wetted some time before the instant of its use in a mould, there is a risk that water initially absorbed will be released by evaporation and the wetting will thus be so far reduced that the risk of dust formation again arises.

The aim of the present invention is to provide a powdered material, for example a parting agent or compound, containing talc which does not exhibit this tendency towards dust formation or at least not to the same extent as with hitherto known powdered talc-containing materials. The aim is moreover to provide material capable of retaining for a long period the property, which is obtained by appropriate preparation of the talc, of not forming dust, so that the preparation into a non-dust producing form does not need to be carried out at the place of use nor just before the talc is used. In addition the material produces no other subsidiary adverse effects considered from the point of view of protection of work people and the environment or other aspects. The favourable properties of the material for use as a parting agent are not however adversely affected.

To this end, according to this invention, a powdered material, for use for example as a parting agent or compound, contains talc together with one or more organic compounds which possess good adhesion properties with respect to talc.

According to another aspect of the invention, in a method of producing such a material, the organic compound or compounds are mixed in the liquid state with the talc.

The above described disadvantages of known parting agents and of the known use of talc as a parting agent or for other purposes no longer occur with the material in accordance with the invention. In particular, the disadvantages associated with the wetting of talc with water no longer arise.

The proportion of the organic compound or compounds added to the talc will depend upon the detailed nature of these compounds and upon the intended use. The added organic compounds preferably constitute a proportion of 1 to 15% by weight of the talc. In some cases, for example where dioctyl phthalate is used in the rubber industry, a proportion of about 5% has been found optimum. Too great an addition of organic compounds not only leads to a considerable increase in manufacturing costs but can also result in the lubricating action of the powdered material being reduced. A material consisting of 95% by weight talc and 5% by weight dioctyl phthalate had yielded good results as a parting agent when used as a mould internal coating for casting and vulcanising moulds.

Where the material is used for powdering the surfaces of materials, favourable results have been obtained with an addition of glycerine and, for example, of secondary alkyl sulphate as an emulsifying agent, these being in approximately equal quantities. An emulsion is first formed from these two compounds and then this emulsion is added to the talc by spraying.

The organic compounds used as additives can in general be obtained as high molecular number distillation fractions from mineral oils having a boiling point exceeding 200° C or as high-molecular aryl or alkyl esters or aryl or alkyl amides of benzole, alkane, alkene or alkin carbonic acids or the corresponding dicarbonic acids. It is also possible to use as additives to talc polyalcohols, especially glycerine and silicone oil (silica oil). The additives may consist of one or more of these compounds, which in turn may be selected from one or more of the categories mentioned. It should be pointed out that they should be selected, having regard to the particular intended applications, in such a way that no materials are used which can react chemically with the material to be treated. Obviously also, the use of those compounds which can be harmful to the human body is to be avoided.

The mechanism underlying the good results which are obtained by the material in accordance with this invention is not fully understood. What probably happens is that the additive or additives surround the individual talc particles with extremely thin coatings, so that the resulting density of the particles is increased and also a certain attraction is produced between the particles. The coatings are however so thin that their presence cannot be detected with the unaided eye. It is also assumed that the coatings only partially cover the surfaces of the talc particles. In any case, a material is obtained having no tendency towards the formation of dust, and in which the lubricating and parting action is not adversely affected by the additives.

Two examples of materials and of methods of making them in accordance with the invention will now be described:

EXAMPLE 1

50 kg of talc was introduced into a mixing machine, which was then operated for 30 minutes. During this period, dioctyl phthalate amounting to 5% by weight of the total weight of the mixture was added. The dioctyl phthalate was prepared in liquid form and introduced by spraying. The mixture obtained was sieved in order to remove those particles which had grown to an undesirable size by agglomeration. In this way, a parting agent or mould coating agent was obtained which was completely free of dust and also possessed the same lubricating action as untreated talc.

EXAMPLE 2

An emulsion of 40% water, 50% glycerine and 10% secondary alkyl sulphate by weight was prepared. As in Example 1, the emulsion was then sprayed into talc. In this way material was obtained which, although not entirely dust-free, exhibited a considerably reduced tendency to dust formation in comparison with untreated talc. The material was particularly suitable for powdering the surfaces of materials, which without some suitable treatment have a tendency to stick together in an undesirable manner by adhesive action or cohesion.

Details of the invention are described above with reference to only one example of its application namely as a parting agent.

It should however be emphasized that the advantage of material in accordance with the invention is based upon the fact that the emission of dust from the talc is largely suppressed.

It is therefore evident that the material in accordance with the invention can be utilised in all those fields, in which operations are carried out with a fine-grained talc-containing powder.

Further examples of the use of powdered material in accordance with the invention are as pigments in the paint and dye manufacturing industry.

I claim:

1. A powder composition consisting of (i) talc particles and (ii) dioctyl phthalate as an anti-dusting agent on the surface of said talc particles, said dioctyl phthalate being in an amount between about 1% and 15% by weight of the total of said talc and said dioctyl phthalate.

2. The powder composition of claim 1 wherein said dioctyl phthalate is in an amount of about 5%.

\* \* \* \* \*